(12) United States Patent
Bardon et al.

(10) Patent No.: US 8,007,556 B2
(45) Date of Patent: Aug. 30, 2011

(54) BLOCK FOR FILTERING PARTICLES CONTAINED IN EXHAUST GASES OF AN INTERNAL COMBUSTION ENGINE

(75) Inventors: Sébastien Bardon, Lyons (FR); Anthony Briot, Avignon (FR); Vincent Gleize, Avignon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 423 days.

(21) Appl. No.: 10/583,938

(22) PCT Filed: Dec. 22, 2004

(86) PCT No.: PCT/FR2004/003340
§ 371 (c)(1),
(2), (4) Date: Sep. 1, 2006

(87) PCT Pub. No.: WO2005/064132
PCT Pub. Date: Jul. 14, 2005

(65) Prior Publication Data
US 2007/0169451 A1    Jul. 26, 2007

(30) Foreign Application Priority Data
Dec. 24, 2003    (FR) ..................................... 03 15389

(51) Int. Cl.
*B01D 24/00* (2006.01)
(52) U.S. Cl. ............ 55/523; 55/385.3; 55/522; 55/524; 55/529; 55/DIG. 30; 131/343; 428/116
(58) Field of Classification Search ............ 55/522, 55/523, 524, 385.3, 529, DIG. 30; 131/343; 428/116
See application file for complete search history.

(56) References Cited

U.S. PATENT DOCUMENTS

| 4,276,071 | A | | 6/1981 | Outland |
| 4,364,760 | A | * | 12/1982 | Higuchi et al. ................. 55/523 |
| 5,629,067 | A | * | 5/1997 | Kotani et al. ................. 428/116 |
| 6,060,148 | A | * | 5/2000 | Matsubara et al. ........... 428/116 |
| 6,656,564 | B2 | * | 12/2003 | Ichikawa et al. ............. 428/116 |

(Continued)

FOREIGN PATENT DOCUMENTS
EP    0 867 222    9/1998
(Continued)

OTHER PUBLICATIONS

Webster's Third New International Dictionary, Unabridged, 1993.*

(Continued)

*Primary Examiner* — Jason M Greene
*Assistant Examiner* — Anthony Shumate
(74) *Attorney, Agent, or Firm* — Young & Thompson

(57) ABSTRACT

A block, particularly for filtering particulates present in the exhaust gases of an internal combustion engine, includes a plurality of flow channels for the gases (14e,14s), each of the channels (14e,14s) being bounded by a side wall (22), a plug (15e,15s) and an opening (19e,19s) terminating outwardly. The block according to the invention is remarkable in that a first portion (34) of the side wall (22) of at least one of the channels (14p,14p"), called the "reinforced channel", includes a reinforcement compared to the rest of the side wall (22) forming a second portion (36) of the side wall (22), the ratio (R) of the thickness of the first portion (34) to the thickness of the second portion (36), in any transverse plane of section (P), being between 1.1 and 3.

14 Claims, 4 Drawing Sheets

U.S. PATENT DOCUMENTS

| | | |
|---|---|---|
| 6,669,751 B1 * | 12/2003 | Ohno et al. ............... 55/523 |
| 7,037,567 B2 | 5/2006 | Hashimoto et al. |
| 2003/0041730 A1 | 3/2003 | Beall et al. |

FOREIGN PATENT DOCUMENTS

| | | | |
|---|---|---|---|
| EP | 1 142 619 A | | 10/2001 |
| JP | B-62060320 | * | 12/1986 |
| JP | B-62018797 | * | 4/1987 |
| JP | B-05041296 | * | 6/1993 |
| JP | 2003010616 | | 1/2003 |
| JP | 2002 292225 A | | 2/2003 |
| JP | 2003 117322 A | | 4/2003 |
| WO | WO 01/23069 A1 | * | 4/2001 |
| WO | 02/089979 | | 11/2002 |

OTHER PUBLICATIONS

JP Office Action dated Jan. 4, 2010 from corresponding JP2006546247.

* cited by examiner

US 8,007,556 B2

BLOCK FOR FILTERING PARTICLES CONTAINED IN EXHAUST GASES OF AN INTERNAL COMBUSTION ENGINE

FIELD OF THE INVENTION

The invention relates to a block and to a body formed by assembling a plurality of said blocks, used in particular for filtering particulates present in the exhaust gases of an internal combustion engine, particularly of the diesel type.

BACKGROUND OF THE INVENTION

Conventionally, before being released to the open air, the exhaust gases may be purified by means of a particulate filter like the one shown in FIGS. 1 and 2, known in the prior art.

A particulate filter 1 is shown in FIG. 1 in a transverse cross section, along the plane of section B-B shown in FIG. 2, and in FIG. 2 in a longitudinal cross section along the plane of section A-A shown in FIG. 1.

The particulate filter 1 conventionally comprises at least one filter body 3, inserted in a metal housing 5. The filter body 3 results from the assembly and machining of a plurality of blocks 11, referenced 11a-11i.

To fabricate a block 11, a ceramic material (cordierite, silicon carbide, etc.) is extruded to form a porous honeycomb structure. The extruded porous structure conventionally has the shape of a rectangular parallelepiped, comprising four longitudinal edges 11', extending along an axis D-D between two substantially square upstream 12 and downstream 13 faces at which a plurality of adjacent, square section, straight channels 14 terminate, parallel to the axis D-D. The channels are formed by the interpenetration of two sets of plane and parallel partitions, the partitions of the first set being perpendicular to the partitions of the second set. The four partition portions bounding a channel 14 constitute a side wall 22 of this channel. Conventionally, all the partitions of the two sets have the same thickness, that is, the side wall 22 of any channel 14 has a constant thickness.

After extrusion, the extruded porous structures are alternately plugged on the upstream face 12 (outlet channels 14s) or on the downstream face 13 (inlet channels 14e), by upstream 15s and downstream 15e plugs, respectively, as is well known. At the opposite end of the outlet 14s and inlet 14e channels from the upstream 15s and downstream 15e plugs, respectively, the outlet 14s and inlet 14e channels terminate outwardly in outlet 19s and inlet 19e openings, respectively, extending on the downstream 13 and upstream 12 faces, respectively.

Each channel 14 thereby defines an internal volume 20 bounded by the side wall 22, a plug 15s or 15e, and an outwardly terminating opening 19s or 19e.

The set of external faces 15' of the channels located at the periphery of a block 11, or "peripheral channels" 14p, forms an external surface 16 of the block 11 (see FIG. 3). Because of the substantially square transverse cross section of the block 11, the external surface 16 comprises four faces 16a-16d, perpendicular in pairs.

The blocks 11a-11i are assembled together by bonding using seals 27 of ceramic cement generally consisting of silica and/or silicon carbide and/or aluminum nitride. The assembly thus formed can then be machined to obtain, for example, a round cross section. Thus the external blocks 11a, 11b, 11c, 11d, 11e, 11f, 11g, 11h have an external face that is rounded by machining.

This produces a cylindrical filter body 3 with axis C-C, which can be inserted into the housing 5, a peripheral seal 28, gastight to the exhaust gases, being arranged between the external filter blocks 11a-11h and the housing 5.

As indicated by the arrows shown in FIG. 2, the flow F of exhaust gases enters the filter body 3 via the openings 19e of the inlet channels 14e, passes through the filtering side walls of these channels to join the outlet channels 14s, and then escapes to the exterior via the openings 19s.

After a certain period of use, the particulates, or "soot", accumulated in the inlet channels 14e of the filter body 3 impair the performance of the engine. This is why the filter body 3 must be regenerated regularly, for example every 500 kilometers. The regeneration, or "unclogging", consists in oxidizing the soot by heating it to a temperature permitting its ignition.

During the regeneration phases, the exhaust gases transport downstream all the heat energy liberated by the combustion of the soot. Moreover, since the soot is not uniformly deposited in the various channels, the combustion zones are not uniformly distributed in the filter body 3. Finally, the peripheral zones of the filter body 3 are cooled, via the metal housing 5, by the surrounding air.

As a result, the temperature differs according to the zones of the filter body 3 and does not vary uniformly. The nonuniformity of the temperatures within the filter body 3 and the differences in the nature of the materials used for the filter blocks 11a-11i on the one hand, and for the seals 27 on the other, generate high amplitude local stresses, which can cause local breakage or cracks. In particular, the local stresses at the interfaces between the blocks 11a-11h and the housing 5, and between the blocks 11a-11i and the seals 27, can cause cracks in the blocks 11a-11i thereby shortening the service life of the particulate filter 1.

SUMMARY OF THE INVENTION

It is the object of the invention to provide a novel block 11 able to decrease this risk of cracking.

This object is achieved by means of a block, particularly for filtering particulates present in the exhaust gases of an internal combustion engine, said block comprising a plurality of flow channels for said gases, each of said channels being bounded by a side wall, a plug and an opening terminating outwardly.

The filter block according to the invention is remarkable in that a first portion of the side wall of at least one of said channels, called the "reinforced channel", comprises a reinforcement compared to the rest of said side wall forming a second portion of said side wall, the ratio R of the thickness "E" of said first portion to the thickness "e" of said second portion, in a transverse plane of section, being between 1.1 and 3.

As will be seen in greater detail in the rest of the description, the presence of a reinforcement locally strengthens the block, thereby advantageously limiting the risks of cracking.

The filter block according to the invention also comprises, preferably, the following other features:

the filter block comprises a group of said adjacent reinforcement channels arranged so that said first portions of said reinforced channels form a continuous reinforcing partition. The reinforcement formed by said reinforced channels is thus continuous. The continuity of the reinforcement confers an additional stiffness on the filter block, thereby advantageously helping to even further limit the appearance of cracks.

the reinforced channels of said group extend to the periphery of said block. The reinforcing partition can thereby, at least partly, surround the internal channels and stiffen them. The cracking of the internal channels thus "protected" is thereby advantageously limited.

said first portion comprises an external face in contact with the exterior of said block.

said reinforced channels of said group are arranged so that said reinforcing partition overlaps a longitudinal edge of said filter block. The longitudinal edges of the filter block are the zones of appearance of the highest thermomechanical stresses. An overlap of these zones by the reinforcing partition is therefore advantageous.

said group of reinforced channels comprises all the peripheral channels of said block. The reinforcing partition thereby surrounds the filter block. Such a surround advantageously serves to stiffen all the channels of the block in a particularly effective manner. Preferably, said reinforcing partition is at the external surface of said block.

said ratio of R=E/e is constant irrespective of said transverse plane of section P considered. The stiffening effect of the reinforcement or of the reinforcing partition is thereby substantially constant along the whole length L of the filter block.

said reinforcement is substantially constant in any longitudinal plane of section of said block. Advantageously, the fabrication of the block, and particularly the extrusion of the initial porous structure, is thereby simplified.

said reinforcement is substantially constant for all the reinforced channels of said group, in any transverse plane of section and/or in any longitudinal plane. The reinforcing partition thus has a substantially constant thickness.

said ratio R is between 1.9 and 2.1, preferably is substantially equal to 2. Such ratios R have in fact advantageously served to obtain the lowest level of cracking.

The invention also relates to a filter body for a particulate filter, which is remarkable in that it comprises at least one filter block according to the invention.

The invention also relates to an extrusion die shaped so as to form, by extrusion of a ceramic material, a structure provided with channels suitable for the fabrication of a filter block according to the invention, said structure comprising said reinforcement. According to the invention, the filter block is preferably "one-piece", that is, the reinforcement is not added on to the filter block, but is of one piece with it. The stiffness of the filter block and its resistance to cracking are thereby advantageously improved. Furthermore, any risk of delamination of material forming the reinforcement is thereby advantageously eliminated. Finally, the fabrication of the filter block is thereby simplified.

The invention also relates to a method for fabricating a filter block comprising the following successive steps:

a) extrusion of a ceramic material to form a porous honeycomb structure, b) application of a reinforcement of a material, identical or different from said ceramic material, to at least part of the external surface of said porous structure, and c) drying and sintering of said porous structure to obtain a filter block.

Optionally, the porous structure may be dried between steps a) and b), and then machined, the material reinforcement being preferably applied at least to part of said external surface having been machined.

The filter block obtained can be assembled with other filter blocks, preferably with the interposition of seals, continuous or not, to fabricate a filter body.

BRIEF DESCRIPTION OF THE DRAWINGS

The description that follows, with reference to the drawings appended hereto, will help to better understand and appreciate the advantages of the invention. In these drawings.

DETAILED DESCRIPTION OF THE EMBODIMENTS

In these figures, which are nonlimiting, the various elements are not necessarily shown to the same scale. Identical references have been used in the various figures to denote identical or similar elements.

Figure 4:
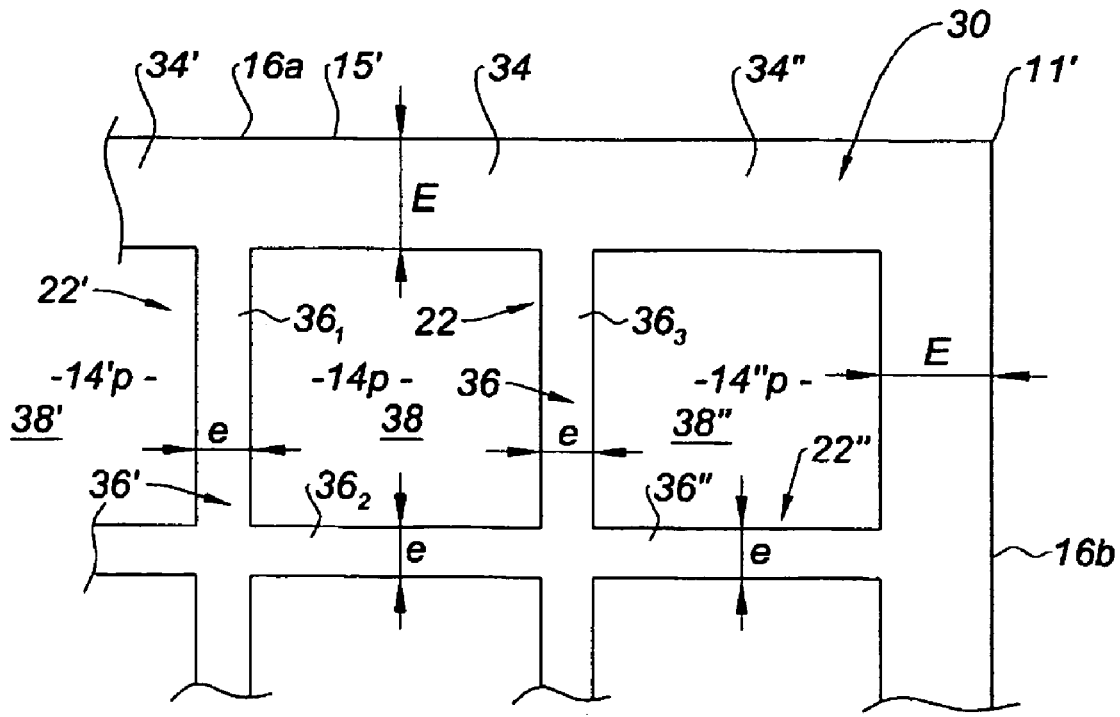
FIG. 4 shows, in transverse cross section along the plane P shown in FIG. 3, a detail of the block shown FIG. 3.

According to the invention, a portion of side wall of a channel comprises a "reinforcement" when it is thicker than the rest of the side wall of this channel. The channel is then dubbed a "reinforced channel". As shown in FIG. 4, to measure a thickness of a wall of a channel, one takes a position opposite this wall, thereby excluding any thickness measurement in the corners of the internal volume of this channel.

The expression "reinforcing partition" is applied to a set of wall portions having a reinforcement, said set forming a continuous surface, plane or not.

Figure 1:
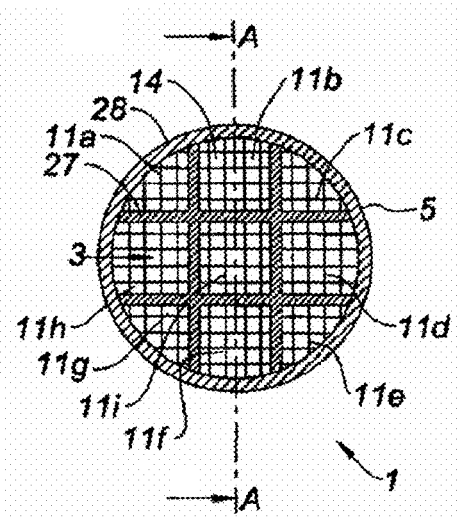
FIG. 1 shows a particulate filter of the prior art, in transverse cross section along the transverse plane of section B-B shown in FIG. 2.
Figure 2:
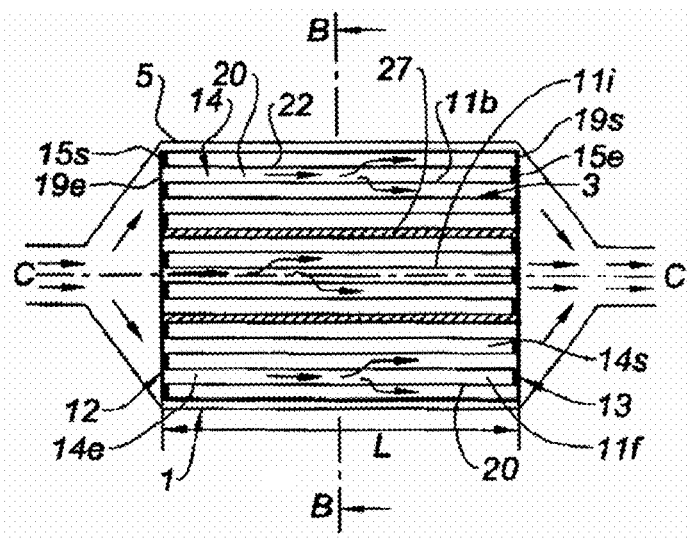
FIG. 2 shows the same particulate filter, along the longitudinal plane of section A-A shown in FIG. 1.
Figure 3:
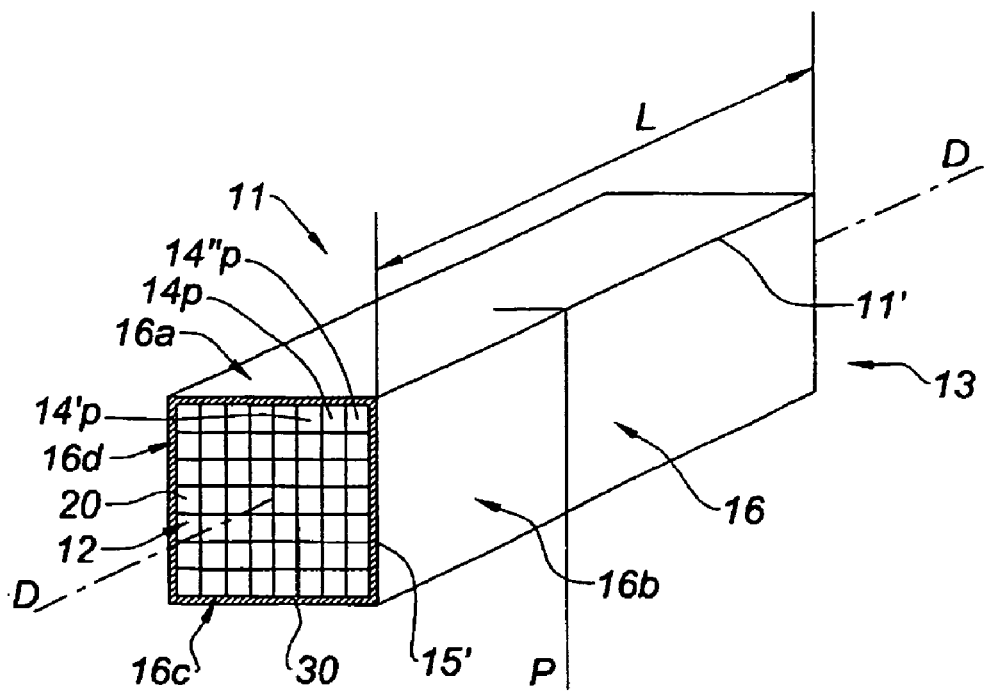
FIG. 3 shows a perspective view of a block according to the invention, in the preferred embodiment.

FIGS. 1 and 2 having been described in the preamble, we shall now refer to FIG. 3, also partially described above.

The filter block 11 shown in FIG. 3 comprises a reinforcing partition 30 that forms the four faces 16a-d of the external surface 16 of the filter block 11.

FIG. 4 shows three adjacent peripheral channels $14p'$, $14p$ and $14p''$ in detail, bounded by side walls 22', 22 and 22", respectively. The side walls 22', 22 and 22" each have an external portion 34', 34 and 34", respectively, in contact with the exterior of the block 11, and an internal portion 36', 36 and 36", respectively, separating the internal volumes 38', 38 and 38" respectively, from the adjacent channels.

The external portions 34', 34 and 34" have a constant thickness, denoted "E", irrespective of the transverse plane of section P.

The internal portion comprises two or three substantially plane internal parts, according to whether the channel considered extends or does not extend along a longitudinal edge of the block 11.

Thus, the internal portion 36 of the side wall 22 of the channel $14p$ shown comprises three parts $36_1$, $36_2$ and $36_3$, while the internal portion 36" of the side wall 22" of the corner channel $14p''$, defining the longitudinal edge 11', comprises two parts 36" and $36_3$, the part $36_3$ being common to the side walls 22 and 22".

The internal parts have the same constant thickness, denoted "e", irrespective of the transverse plane of section P.

All the peripheral channels have a side wall formed on the model described above, with an internal portion of constant thickness "e", and an external portion of constant thickness "E".

The reinforcing partition 30 is formed by all the external portions of the side walls of the peripheral channels. Its thickness is constant and equal to "E". The reinforcing partition 30 extends along the whole length "L" of the block 11, from the upstream face 12 to the downstream face 13, forming the external surface 16 of the block 11.

The ratio R of the thickness "E" to thickness "e" is between 1.1 and 3, preferably, between 1.9 and 2.1, and even more preferably, as shown, is substantially equal to 2.

The reinforcing partition thus has the shape of a sleeve with four faces 16a, 16b, 16c and 16d of constant thickness E, open to the upstream and downstream faces of the block 11.

Preferably, the reinforcement of the reinforcing partition is arranged so that, in any transverse plane of section P, the flow cross sections of the reinforced inlet and outlet channels are substantially identical to those of the other inlet and outlet channels, respectively. Advantageously, the application of a reinforcement therefore does not alter the volumes of the reinforced channels and therefore the overall efficiency of the filter block.

Figure 8:
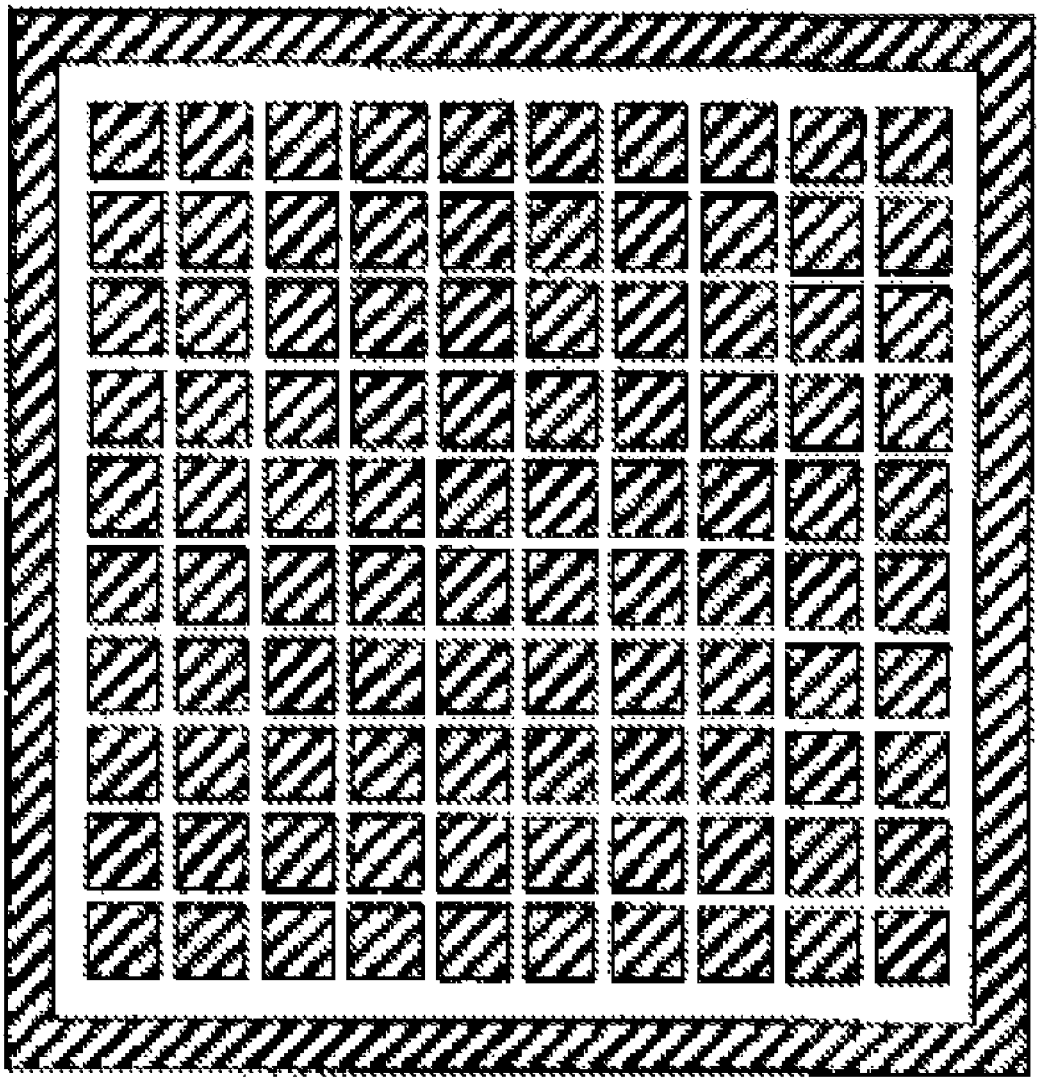
FIG. 8 schematically shows an extrusion die used to form the structure suitable for fabricating a filter block according to the invention.

Preferably, the reinforcing partitions extend longitudinally and are fabricated during the extrusion of the block 11 using a suitable extrusion die (FIG. 8) shaped so as to form, by extrusion of a ceramic material, a structure provided with channels suitable for the fabrication of a filter block according to the invention, according to techniques known to a person skilled in the art.

The assembly of blocks according to the invention produces a structure which has an internal network of reinforcing partitions improving its resistance to cracking.

After optional machining of this structure to form a filter body, a material reinforcement can be added at the periphery of the filter body. The risk of cracking is thereby further diminished.

In one embodiment of the invention, all the assembled blocks have a reinforcement, preferably constant, along their whole external surface 16. After assembly, the peripheral reinforcements of the blocks thereby form in transverse cross section, a grid considerably enhancing the resistance to cracking compared to a filter body that does not have a reinforcement at its periphery.

More preferably, irrespective of the embodiment, the thickness of the internal portions of the side walls of the peripheral channels is identical to the thickness of the walls of the internal channels (that is, which are not peripheral channels) of the filter block. The efficiency of filtration across all the internal walls of the filter block, that is, walls which are not in contact with the exterior of the block, is thereby substantially the same, irrespective of the internal wall considered.

The fabrication of the filter body is also thereby simplified, because the filter blocks can be assembled interchangeably at any position inside the filter body.

Figure 5:
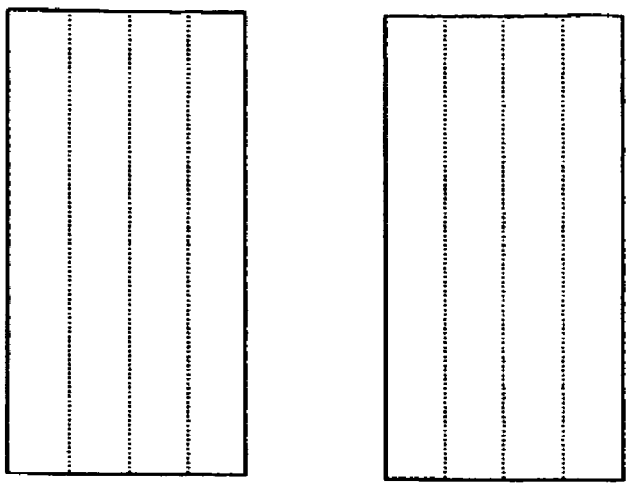
FIGS. 5 and 6 show, in plan view, longitudinal cross sections, along a median plane M as shown in FIG. 7, of filter bodies consisting of 16 blocks according to and not according to the invention, respectively, after having undergone severe regeneration tests.
Figure 6:
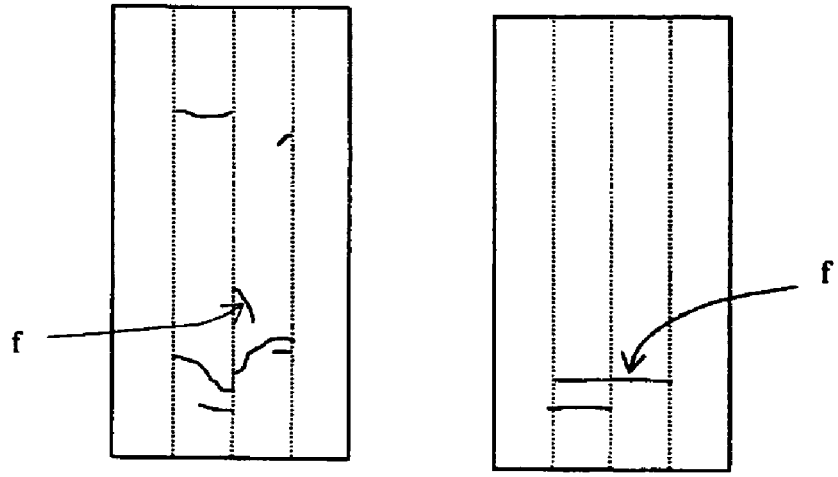
Figure 7:
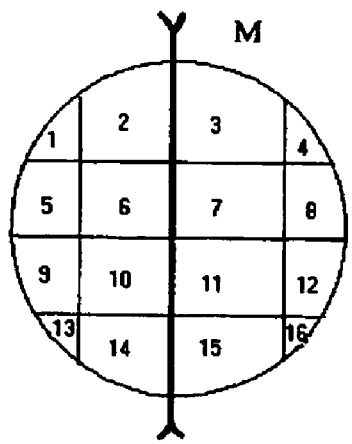
FIG. 7 shows, in transverse cross section, a filter body used for said tests.

Tests have been conducted to evaluate the cracking resistance of a filter body comprising 16 conventional filter blocks (FIG. 6) and of a filter body comprising 16 blocks of the same type but, like the block shown in FIG. 3, comprising a peripheral reinforcing partition according to the invention (FIG. 5). These two filter bodies were subjected to severe regeneration (corresponding to an engine speed of 120 km/hour, followed by transition to idling speed followed by post-injection) to 5 g/l on an engine test bench. The filter blocks were then cut longitudinally along a median plane. The longitudinal sections of four filter blocks are thus observed. A comparison of the longitudinal sections shown in FIGS. 5 and 6 clearly shows that the blocks according to the invention do not have any cracks, unlike the blocks according to the prior art, which have cracks "f" of a length generally greater than 0.5 mm and possibly extending along the whole length L of the block. Cracks are visible to the naked eye and under the microscope.

As is clearly apparent now, the filter block with reinforced structure according to the invention has better resistance to cracking than the blocks of the prior art.

Obviously, the present invention is not limited to the embodiment described and shown above, which is provided for illustration and is nonlimiting.

The thickness E is not necessarily constant along a transverse section of a portion of wall having a reinforcement. In particular, said wall portion may have one plane face and one domed or wavy face. If the block 11 comprises a reinforcing partition forming its external surface 16, the plane face of the wall portions forming this partition is preferably an external face, so that the external surface 16 of the block is formed of flat sections, while the internal face of the reinforcing partition has waves, in transverse cross section.

Neither is the thickness E necessarily constant between the various reinforced channels forming a reinforcing partition. For example, the thickness E may be larger for the outlet channels than for the inlet channels.

Thus, the reinforcing partition may be locally interrupted by "pockets" without reinforcement, may not extend along the whole length L of the block, or may extend along only part of the peripheral channels of the block.

In this latter case, preferably, the reinforcing partition nevertheless overlaps at least one longitudinal edge of the filter block, preferably all the longitudinal edges. Preferably, the reinforcing partition extends along the whole length L of the block.

The shape, dimensions and number of reinforcing partitions are nonlimiting.

Preferably, the block 11 comprises only one continuous reinforcing partition, forming its external surface 16. The external surface 16 of a block is in fact not or only little used for filtering the gases, the seals 27 in contact with this external surface 16 forming a substantially gastight barrier to the gases. Arranging the reinforcing partition at the periphery of the block thereby avoids decreasing the overall filter area of the block, and hence the filtration efficiency of the block. Preferably, the average thickness E* of the reinforcing partition is greater than the average thickness of the walls or wall portions of the channels of the block other than the wall portions forming the reinforcing partition.

However, one or more reinforcing partitions could also be inserted in the block, preferably traversing the block completely, more preferably extending substantially parallel to the side faces 16a-16d of the block.

The thickness of a reinforcing partition could also evolve, periodically or not, in a longitudinal or transverse plane. Advantageously, it is thus possible to adapt the thickness of the reinforcing partition to the intensity of the local thermomechanical stresses.

In a transverse plane of section, it is preferable for the reinforcement to vary uniformly, preferably in a substantially sinusoidal manner, in order to increase the volume of the inlet channels compared to the volume of the outlet channels.

It is also possible to arrange a reinforcement on the surface of the block 11 by fixing additional material thereon by bonding, welding or any other known technique. The material added on may be identical or different to the material constituting the block 11. A material reinforcement is preferably applied, after extrusion, to those faces of the blocks having been machined, for example, to the rounded external faces of the blocks 11a-11b.

The filter block 11 could have any shape. The transverse cross section of the channels 14 is not limited to the square shape. The cross section of the inlet channels could also be different from that of the outlet channels. The transverse cross section of a channel could also evolve, periodically or not, along this channel.

The invention claimed is:

1. A filter body, particularly for filtering particulates present in the exhaust gases of an internal combustion engine, comprising:
    a plurality of one-piece blocks; and
    seals assembled with said blocks, a nature of a material of said seals being different from a nature of a material of said blocks,
    the plurality of said blocks each comprising a plurality of flow channels for said exhaust gases, each of said flow channels being bounded by a respective side wall, a plug, and an opening terminating outwardly, wherein a side wall of a flow channel defines a boundary on all sides in a transverse cross-section for surrounding an internal volume of the flow channel,
    wherein the plurality of flow channels of each block comprises internal channels and at least one reinforced channel, a first portion of the side wall of the at least one reinforced channel comprising a reinforcement compared to all other portions of said side wall, said first portion having an external face defining an exterior of the block, and a ratio of a thickness of said first portion to a thickness of said other portions, in the transverse cross-section, being always between 1.1 and 3, the thickness of the other portions being identical to a thickness of side walls of the internal channels,
    wherein the filter body comprises a plurality of adjacent reinforced channels arranged so that each said first portion of said reinforced channels form a continuous reinforcing partition, a thickness of said reinforcing partition being substantially constant,
    wherein said reinforcement is substantially constant for all the reinforced channels of a group in any transverse plane of section and/or in any longitudinal plane, and
    wherein inlet channels of the plurality of flow channels each have a shape in the transverse cross-section, outlet channels of the plurality of flow channels each have a shape in the transverse cross-section, and the shape of the inlet channels is different than that of the outlet channels.

2. The filter body as claimed in claim 1, wherein said reinforced channels of said group are arranged so that said reinforcing partition overlaps a longitudinal edge of said filter block.

3. The filter body as claimed in claim 1, wherein said group of reinforced channels comprises all peripheral channels of said block so that said reinforcing partition surrounds said block, so that said reinforcing partition is at an external surface of said block.

4. The filter body as claimed in claim 1, wherein said ratio is constant irrespective of the transverse plane of section considered.

5. The filter body as claimed in claim 1, wherein said reinforcement is substantially constant in any longitudinal plane of section of said block.

6. The filter body as claimed in claim 1, wherein said ratio is between 1.9 and 2.1.

7. A filter body as claimed in claim 1, wherein at least one of said blocks presents the shape of a rectangular parallelepiped.

8. A filter body as claimed in claim 1, wherein all the assembled blocks have said reinforcement along their whole external surface.

9. The filter body as claimed in claim 1, wherein the reinforcement of the reinforcing partition is arranged so that, in any transverse plane of section, the flow cross sections of the reinforced inlet and outlet channels are substantially identical to those of the internal channels, inlet and outlet, respectively.

10. A filter body as claimed in claim 3, wherein at least one of said blocks presents the shape of a rectangular parallelepiped.

11. The filter body as claimed in claim 6, wherein said ratio is substantially equal to 2.

12. An extrusion die conformed to form, by extrusion of a ceramic material, a structure provided with channels comprising a plurality of flow channels, each of said flow channels being bounded by a side wall, a side wall of a flow channel defining a boundary on all sides in a transverse cross-section for surrounding an internal volume of the flow channel,
    wherein the plurality of flow channels of each structure comprises internal flow channels and at least one reinforced channel, a first portion of the side wall of the at least one reinforced channel comprising a reinforcement compared to all other portions of said side wall, said first portion having an external face defining an exterior of the structure, and a ratio of a thickness of said first portion to a thickness of said other portions, in the transverse cross-section, being always between 1.1 and 3, the thickness of the other portions being identical to a thickness of side walls of the internal channels, and
    wherein inlet channels of the plurality of flow channels each have a shape in the transverse cross-section, outlet channels of the plurality of flow channels each have a shape in the transverse cross-section, and the shape of the inlet channels is different than that of the outlet channels.

13. A method for fabricating a filter block comprising a plurality of flow channels for exhaust gases, each of said flow channels being bounded by a side wall, a side wall of a flow channel defining a boundary on all sides in a transverse cross-section for surrounding an internal volume of the flow channel, and a plug and an opening terminating outwardly, wherein the plurality of flow channels of each structure comprises internal channels and at least one reinforced channel, a first portion of the side wall of the at least one reinforced channel comprising a reinforcement compared all other portions of said side wall, said first portion having an external face defining an exterior of the structure, and a ratio of a thickness of said first portion to a thickness of said other portions, in the transverse cross-section, being always between 1.1 and 3, and wherein inlet channels of the plurality of flow channels each have a shape in the transverse cross-section, outlet channels of the plurality of flow channels each have a shape in the transverse cross-section, and the shape of the inlet channels is different than that of the outlet channels, said method comprising the following successive steps:
    extrusion of a ceramic material through a die to form a porous honeycomb structure,
    alternate plugging on an upstream face and on a downstream face, and
    drying and sintering of said plugged porous structure to obtain said filter block.

14. A method for fabricating a filter body by assembling a plurality of filter blocks, wherein a plurality of said filter blocks each comprise a plurality of flow channels for exhaust gases, each of said flow channels being bounded by a side wall, a side wall of a flow channel defining a boundary on all sides in a transverse cross-section for surrounding an internal volume of the flow channel, and a plug and an opening terminating outwardly, wherein the plurality of flow channels of each block comprises internal channels and reinforced channels, a first portion of the side wall of the reinforced channels each comprising a reinforcement compared all other portions of said side wall, said first portion having an external face defining an exterior of the structure, and a ratio of a thickness of said first portion to a thickness of said other portions, in the transverse cross-section, being always between 1.1 and 3, the reinforced channels arranged so that each said first portion of said reinforced channels form a continuous reinforcing partition, a thickness of said reinforcing partition being substantially constant, wherein inlet channels of the plurality of flow channels each have a shape in the transverse cross-section, outlet channels of the plurality of flow channels each have a shape in the transverse cross-section, and the shape of the inlet channels is different than that of the outlet channels, and wherein each of said plurality of filter blocks is fabricated by the following successive steps:

extrusion of a ceramic material through a die to form a porous honeycomb structure; and drying and sintering of said porous structure to obtain said filter blocks.

\* \* \* \* \*